US006834372B1

(12) United States Patent
Becker et al.

(10) Patent No.: US 6,834,372 B1
(45) Date of Patent: *Dec. 21, 2004

(54) INTERNET WEB BROWSER WITH PROXIMITY SENSITIE HYPERLINK HISTORY REPORT

(75) Inventors: Craig Henry Becker, Austin, TX (US); David Wayne Glass, Georgetown, KY (US); Michael David Hocker, Staatsburg, NY (US); James Gordon McLean, Fuquay-Varina, NC (US); Clifford Alan Pickover, Yorktown Heights, NY (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/507,485

(22) Filed: Feb. 10, 2000

(51) Int. Cl.[7] .............................................. G06F 17/00
(52) U.S. Cl. ..................... 715/501.1; 715/513; 715/859
(58) Field of Search ..................... 715/500.1, 501.1, 715/513, 530, 859, 500; 707/9, 10

(56) References Cited

U.S. PATENT DOCUMENTS

| | | | |
|---|---|---|---|
| 5,603,034 A | 2/1997 | Swanson | 395/701 |
| 5,754,176 A | 5/1998 | Crawford | 345/338 |
| 5,761,683 A | 6/1998 | Logan et al. | 707/513 |
| 5,825,356 A | 10/1998 | Habib et al. | 345/338 |
| 5,870,769 A * | 2/1999 | Freund | 715/501.1 |
| 6,088,707 A * | 7/2000 | Bates et al. | 715/501.1 |
| 6,163,778 A * | 12/2000 | Fogg et al. | 707/10 |
| 6,362,840 B1 * | 3/2002 | Burg et al. | 345/835 |
| 6,377,983 B1 * | 4/2002 | Cohen et al. | 709/217 |
| 6,411,996 B1 * | 6/2002 | Albers | 709/223 |
| 6,557,015 B1 * | 4/2003 | Bates et al. | 715/501.1 |
| 6,763,496 B1 * | 7/2004 | Hennings et al. | 715/501.1 |

FOREIGN PATENT DOCUMENTS

JP         11039310        7/1997        G06F/17/30

OTHER PUBLICATIONS

Netscape® Communicator 4.08 for Windows NT, Copyright © 1994–1998 Netscape Communications Corporation.*
Comparing WFC and JVC: Foundation Classes for Java Development, *Dr. Dobb's Journal*, vol. 24, Issue 2, Feb. 1999, pp. 90–95.
"Next Button for Jumping/Tabbing between Internet Hypertext Transfer Protocol Hyperlinks", *IBM Technical Disclosure Bulletin*, 1/98, pp. 435–436.
RD–410107, May 20, 1998.

* cited by examiner

*Primary Examiner*—Stephen S. Hong
*Assistant Examiner*—Adam M Queler
(74) *Attorney, Agent, or Firm*—Allen K. Bates; John C. Kennel

(57) ABSTRACT

A web browser program presents historical information about hyperlinks shown on web pages. Initially, the computer determines whether it is receiving certain user input, such as placement of a cursor over a hyperlink for a certain time. When this occurs, the computer accesses a database to determine whether one or more users in a predefined access group have previously selected the hyperlink for the purpose of downloading underlying data represented by the hyperlink. Some examples of the underlying data include web pages, graphics images, software programs, and the like. If the hyperlink has not been previously selected, no action needs to be taken. However, if the database shows that the hyperlink has been previously selected, the computer consults the database to gather characteristics of the underlying data obtained from previous selections of the hyperlink by access group members. Such characteristics may include, for example, the data's size, date of last download, expired or "under construction" status of web site, errors occurring during the download, etc. The computer presents a report containing the characteristics gathered from the database.

22 Claims, 5 Drawing Sheets

- http://www.ibm.com
- 20 Kb, 2.1 seconds
- 17 past hits, no errors
- last access: 11/29/1999
- bookmarked - yes
- user rated at: 9

- http://www.ibm.com
- 20 Kb, 2.1 seconds
- 17 past hits, no errors
- last access: 11/29/1999
- bookmarked - yes
- user rated at: 9

INTERNET WEB BROWSER WITH PROXIMITY SENSITIE HYPERLINK HISTORY REPORT

BACKGROUND OF THE INVENTION

1. Field of the Invention

The present invention relates to internet web browsers. More particularly, the invention concerns an internet web browser configured to sense a predetermined input, such as cursor proximity to a hyperlink, and in response to present a report of various characteristics from past visits to the underlying, hyperlinked data.

2. Description of the Related Art

Web browsers provide one of the most popular ways to access the internet. Broadly, a web browser is a computer program that provides a user friendly, graphical interface to display the contents of internet worldwide web pages ("web pages"). Web browser software directs the user's computer to play sounds, run programs, download software, and display text, graphics, and video. Although invisible to the computer user, web browsers actually operate by retrieving and then executing a web site's underlying program content, which takes the form of hypertext markup language ("HTML") or a similar language.

When displayed by a web browser, most web pages contain one or more "hyperlinks." From the user's perspective, a hyperlink is an on-screen input mechanism, serving an analogous function as a switch, dial, or other physical input apparatus. Hyperlinks are often implemented as graphics icons or text strings. The user activates the hyperlink by operating his/her mouse to place the cursor over the hyperlink and then "clicking" a mouse button; in response, the web browser causes some action to be performed. Frequently, this action involves changing the web browser's display to show a different web page, namely, that web page represented by the hyperlink. Other hyperlink actions include downloading software, displaying video, etc.

Some web browsers can be configured to automatically display hyperlinked web pages as underlined text. As an example, a web browser may display a hyperlink, consisting of "IBM Patent Server". When the user mouse-clicks on this hyperlink, the web browser loads a web page represented by the hyperlink, in this example "http://www.patents.ibm.com/ibm.html." Instead of automatically displaying hyperlinked web pages as underlined text, some web browsers can be configured to temporarily add underlining when the cursor nears the hyperlink text. This feature is present, for example, in the Microsoft Windows Internet Explorer Version 4.72.3612.1713, dated 1995–1997.

Although certain brands of web browser software enjoy widespread commercial success today, engineers at International Business Machines Corp. ("IBM") are continually seeking to improve the performance and efficiency of the human-machine interface, including features such as web browsers. One feature under consideration, for example, is the use of one color (such as purple) to display hyperlinked web sites that the user has visited, and another color (such as blue) to display hyperlinked web sites that the user has not visited. As recognized by the present inventors, this arrangement may not be suitable for color blind people. In this and other respects, the present inventors have discovered that known web browser software is not completely adequate for some applications due to certain unsolved problems.

SUMMARY OF THE INVENTION

Broadly, the present invention provides a web browser program that enables a computer to present historical information about hyperlinks shown on web pages. Initially, the computer determines whether it is receiving certain user input, such as placement of a cursor over a hyperlink for a certain time. When this occurs, the computer accesses a database to determine whether the computer user has previously selected the hyperlink, in order to download underlying data represented by the hyperlink. Some examples of the underlying data include web pages, graphics images, software programs, and the like. If the user has never selected the hyperlink, no action needs to be taken. However, if the database shows that the user has previously selected this hyperlink, the computer consults the database to gather characteristics of the underlying data obtained from previous selections of the hyperlink. Such characteristics may include, for example, the data's size, date of last download, expired or "under construction" status of web site, errors occurring during the download, etc. The computer presents text, graphics, sounds, and/or tactile output to report the characteristics gathered from the database.

In a different embodiment, the computer automatically compares all hyperlinks on the current web page to the historical database irrespective of user input, to more quickly report the results of this comparison when the cursor touches the hyperlinks.

In still another embodiment, there are one or more historical databases that are shared among two or more computers in an "access group." Databases may be shared, for instance, among networked computers, computers with users having common interests, computers whose users work for the same employer, etc. Thus, each user in the access group benefits from historical information about all group members' past encounters with hyperlinked data. Users may even select from among a personal database and one or more databases shared by different groups.

The foregoing features of the invention may be implemented in many ways, including a method to operate a computer, responsive to a predetermined user input such as cursor proximity to a web site hyperlink, to present information representing various characteristics from past visits to the hyperlinked web site. In another embodiment, the invention may be implemented to provide an apparatus, such as a computer, configured to sense a predetermined input, such as cursor proximity to a web site hyperlink, and in response to present information representing various characteristics from past visits to the hyperlinked web site. In still another embodiment, the invention may be implemented to provide a signal-bearing medium tangibly embodying a program of machine-readable instructions executable by a digital data processing apparatus to perform operations as described above. Another embodiment concerns logic circuitry having multiple interconnected electrically conductive elements configured to perform operations as described above.

The invention affords its users with a number of distinct advantages. Beneficially, whenever a user places the cursor near a hyperlinked web site, the invention conveniently presents a data-packed report of various useful characteristics from the user's past visit(s) to that web site. In contrast to previous web browsers, which use mere color to distinguish between visited and non-visited web sites, the present invention's report is useful to color blind people. Moreover, this additional information provides information that helps the user avoid time consuming and possibly unproductive selection of:

1. Hyperlinks that have previously led to web sites that were under construction.
2. Hyperlinks that have previously led to expired web pages or services.
3. Hyperlinks that have previously resulted in large amounts of software, images, or other data to download.
4. Hyperlinks that have had other undesirable characteristics, as encountered by the user during previous selection of those hyperlinks.

With the benefit of this information in advance, the user can avoid the time consuming pitfalls of selecting certain hyperlinks. Thus, the present invention ultimately helps computer users improve their time efficiency while utilizing the internet. By aiding users in avoiding undesirable links, the invention also serves to reduce overall internet traffic. In addition, by reporting whether the user has already bookmarked a hyperlink, the invention helps users avoid flooding their bookmarks with redundant entries. As still another benefit, the shared database feature of the invention assists individual users by providing historical access information encountered by members of an access group, even for hyperlinks that the individual user has never accessed. Another benefit is that the invention helps users return to valuable web pages that have proven to be relevant to their needs. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Overall Structure—Single User Embodiment

Figure 1A:
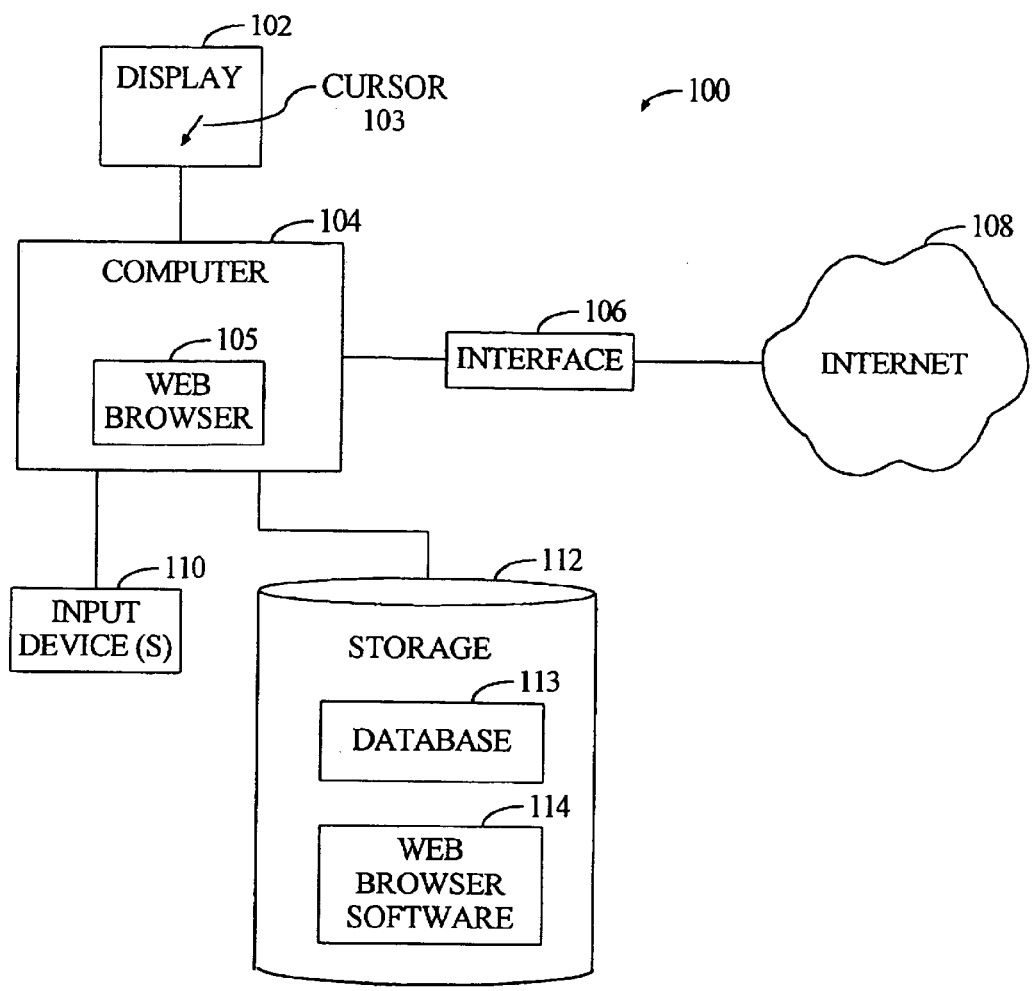
FIG. 1A is a block diagram of the hardware components and interconnections of a single-user internet access system according to the invention.

One aspect of the invention concerns an information system, which may be embodied by various hardware components and interconnections, with one example being described by the system 100 of FIG. 1A The system 100 includes a computer 104 coupled to a display 102, interface 106, storage 112, and input device 110. The interface 106 is coupled to the internet 108.

Considering the components of FIG. 1A in more detail, the computer 104 comprises an apparatus such as a personal computer, computer workstation, "web TV," or other internet access device capable of accessing and navigating the internet 108. The computer 104 includes a web browser program 105 ("web browser"). The display 102 comprises a liquid crystal display (LCD), cathode ray tube (CRT), flat panel, or other display capable of presenting text and graphics. In implementations where the computer 104 is implemented with "web TV," the display 102 may be incorporated with the computer 104. At certain times, depending upon output of the computer 104, the display 102 may present a cursor 103.

The interface 106 comprises a telephone modem, cable modem, Ethernet card, or other apparatus to facilitate bidirectional communications between the computer 104 and the internet 108. Although the illustrated internet 108 is most useful in the context of massive data repositories such as the public internet, the internet 108 may also be embodied by a private internet ("intranet"), networked storage, local storage (such as local hard disk drive), or other any other storage facility whose structure may be interpreted and presented by a web browser.

The storage 112 represents rewritable, nonvolatile digital data storage, such as a magnetic hard disk drive, magnetic tape, random access memory ("RAM") with battery backup, etc. Contained on the storage 112 is a database 113, the structure and operation of which is described in greater detail below. This database 113 may be referred to as a "personal" database, as it contains information about the historical internet activities of the user of the computer 104. An additional database (not shown) may be added for each additional user of the computer 104, or multiple people ca utilize a single user profile. The storage 112 also contains various machine-executable computer programs, the content of which depends upon the computer's hardware structure, intended use, and configuration. Among other programs, the storage 112 contains internet web browser software 114, utilized by the web browser program 105. Examples of this software include the IBM Web Explorer product, Netscape Navigator, Microsoft Internet Explorer, etc.

The system 100 also includes one or more user input devices 110, such as a computer mouse, keyboard, trackball, foot pedal, voice sensor, eye position sensor, or other user input mechanism. Among other possible functions, the input device 110 receives input to control position of cursor presented on the display 102, and select items to which the cursor points. The input devices 110 may also serve to provide "tactile" output perceivable to the human touch, such as vibration, heat, cold, etc.

Exemplary Digital Data Processing Apparatus

Another aspect of the invention concerns a digital data processing apparatus, which may be used to implement the computer 104. This apparatus may be embodied by various hardware components and interconnections; one example is the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise RAM, and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention uses logic circuitry instead of computer-executed instructions to implement the computer 104. Depending upon the particular requirements of the application in the areas of speed, expense, tooling costs, and the like, this logic may be implemented by constructing an application specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

More Detail: Storage Contents

As mentioned above, the storage 112 contains a database 113. The database 113 contains information about the hyperlinks that the computer user has selected in the past. Each time the computer user selects a hyperlink, such as by "mouse clicking," this causes the computer 104 to download underlying data from a web address represented by the hyperlink. Although the underlying data may comprise a hyperlinked web page in most cases, other forms of underlying data are possible as well, such as software programs, sound files, graphics images, etc.

As shown by the specific example of TABLE 1 (below), the database 113 includes various features of the data underlying each hyperlinked web address, according to past visits:

1. The hyperlinked web address itself, which may be listed in as a "www" or other address according to a suitable protocol, such as TCP/IP, for example.
2. The size of the "underlying data" that was downloaded when the hyperlinked web address was accessed by the web browser.
3. The time of downloading the underlying data. This may include, for example, the time required to download the data the last time the user accessed it, or the average time required to download the data if the user has accessed this hyperlink more than once in the past.
4. The number of times that the computer user has previously visited the hyperlinked web address, also called "hits."
5. The number, type, severity, and/or other characteristics of errors experienced during previous visits to the hyperlinked web address.
6. The date and/or time of the user's most recent visit to the hyperlinked web address.
7. Whether the computer user has directed the web browser 105 to create a bookmark for the hyperlinked web address.
8. One or more multimedia symbols selected by the computer user to represent the hyperlinked web address in the manner explained below. Examples include sounds, graphics images, animations, videos, tactile outputs, etc.
9. A single or average rating entered by the computer user during one or more previous visits to the hyperlinked web address.
10. The length of time of previous visits to the hyperlinked address, according to past average or most recent visit.

TABLE 1

Exemplary Database

| HYPERLINKED WEB ADDRESS | http://www.ibm.com | http://www.ibm.com/products | http://www.patent-invention.com | ... |
|---|---|---|---|---|
| DOWNLOAD SIZE | 20 Kb | 25 Kb | 1 Kb | ... |
| DOWNLOAD TIME | 2.1 seconds | 2.5 seconds | 3 seconds | ... |
| #HITS | 17 | 2 | 0 | ... |
| ERRORS? | none | none | 1, under contruction | ... |
| DATE/TIME OF LAST DOWNLOAD | 11/29/1999 | 12/11/1999 | 12/24/1999 | ... |
| BOOKMARKED? | yes | no | no | ... |
| THUMBNAIL SYMBOL | c:\sounds\ibm.wav c:\images\ibm-logo.jpg | none | none | ... |
| USER RATING | 9 | 9 | none | ... |
| AVERAGE TIME OF PREVIOUS VISITS | 20 minutes | 18 minutes | 0 minutes | ... |

Although TABLE 1 illustrates one specific type of the database 113, ordinarily skilled artisans (having the benefit of this disclosure) will recognize that this invention also contemplates many variations in the number and type of characteristics listed in the database 113. Furthermore, the types of characteristics represented in the database 113 may be specified by the user, in case the user's interests vary from the information provided by the specific example of TABLE 1.

Overall Structure—Multi-User Embodiment

Figure 1B:
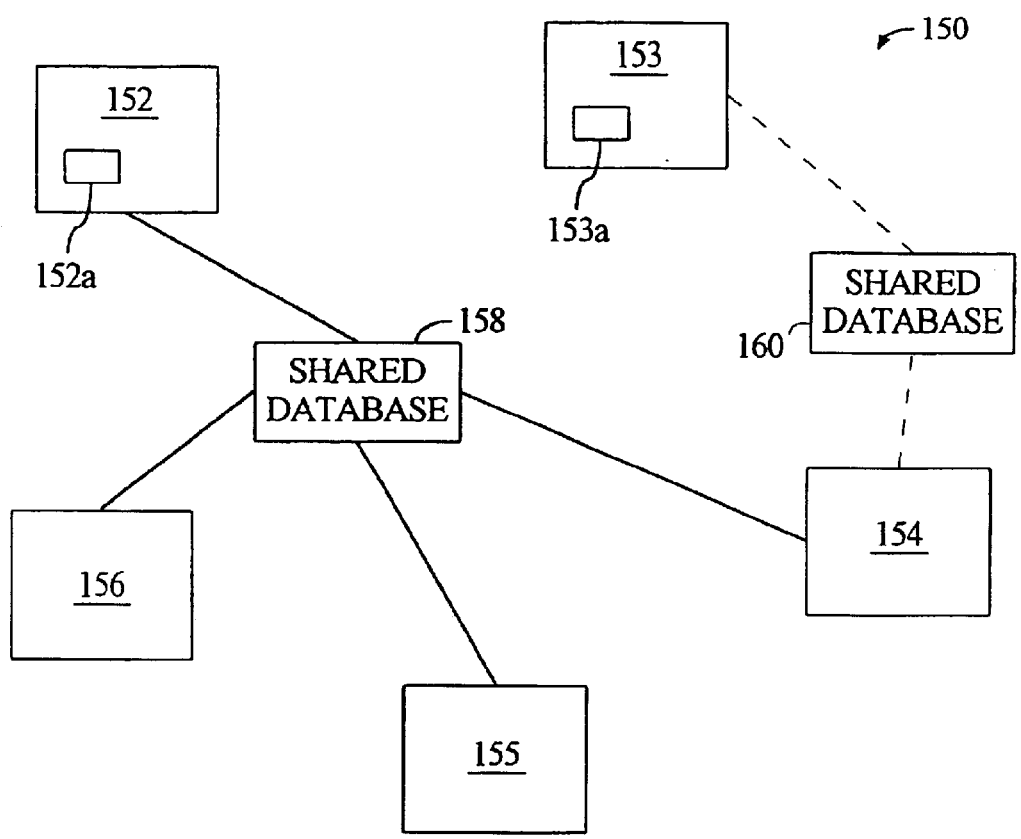
FIG. 1B is a block diagram of the hardware components and interconnections of a multi-user internet access system according to the invention.

In addition to the single-user embodiment described above, the present invention contemplates a multi-user arrangement, which may be embodied by various hardware components and interconnections, with one example being described by the information system 150 of FIG. 1B. The system 150 includes multiple computers 152–156, each of which may contain similar components (not shown) as shown in the single-user application of FIG. 1A. The computers 152–156 illustrate a variety of different database access styles. Namely, the computers 152–153 include separate, respective personal databases 152a, 153a. In contrast, the computers 152, 154–156 share access to the shared database 158. The database 158 may be shared among the computers 152, 154–156 by means of a local or wide area network, the public internet, private internet, bulletin board accessible by dial-up modem, token ring, shared hard disk, or any other arrangement providing data that is accessible to all computers 152, 154–156. Separately, the computers 153–154 share a database 160. The means of sharing the database 160 may be similar to sharing of the database 158.

The computers that share access to a database are referred to as an access group. If an access group has a smaller membership than the physical connections provide, passwords or other suitable gates may be employed to limit database access to group members only. Accordingly, database sharing may be defined by factors additional to physical connection or accessibility to the shared database. For example, each computer may be utilized by several users, and each user may or may not have access to a shared database that is otherwise physically accessible to that computer. Accessibility may be determined by user profiles, access rights given by system administrators, passwords, etc. A shared database may be available to employees of a particular company, users of a particular internet service provider, users in a particular geographic location, users of a particular class (e.g., income, spending habits, interests), etc. Thus, an access group may be comprised of computer users and/or machines. In the case of a single user (FIG. 1A), the access group consists of that single member.

As explained in greater detail below, each personal database provides historical hyperlink access information for one or more users of a particular computer. Each shared database provides historical hyperlink access information for all users in the access group that shares that database. Thus, an individual user benefits from the shared database by receiving historical information about hyperlinks that this user has never visited.

Operation

In addition to the various hardware embodiments described above, a different aspect of the invention concerns a method for operating an internet web browser to respond to predetermined input, such as cursor proximity to a web site hyperlink, and then present a report of various characteristics from past visits to the underlying, hyperlinked data. The web browser of this invention may additionally be configured to solicit and record certain information from the user, such as web site ratings, comments, etc.

Signal-Bearing Media

In the context of FIG. 1A, such a method may be implemented, for example, by operating the computer 104, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to operate a computer to display historical information about hyperlinks shown on web pages.

Figure 2:
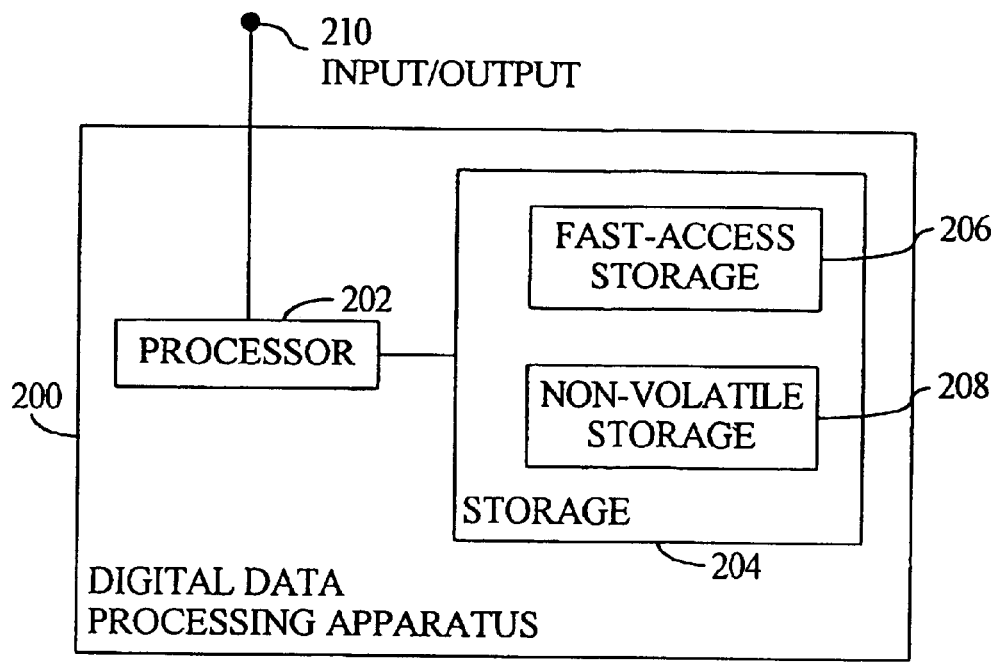
FIG. 2 is a block diagram of a digital data processing machine according to the invention.
Figure 3:
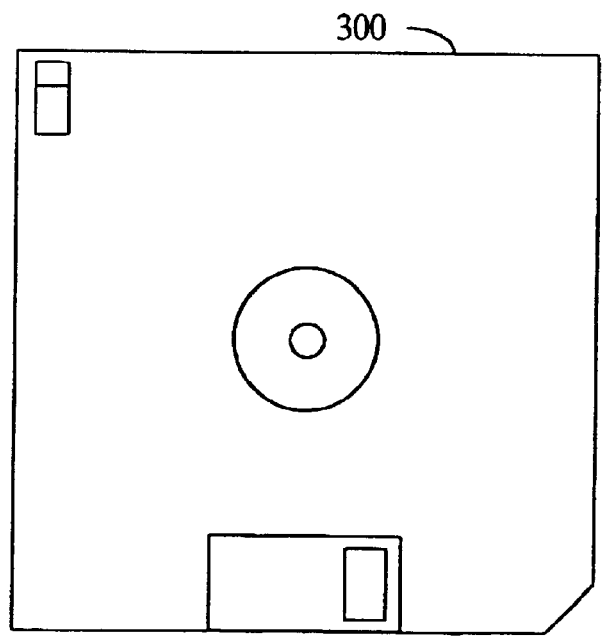
FIG. 3 shows an exemplary signal-bearing medium according to the invention.

This signal-bearing media may comprise, for example, RAM (not shown) contained within the computer 104 (FIG. 1A), as represented by the fast-access storage 206 (FIG. 2). Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive", redundant array of inexpensive disks ("RAID"), or another direct access storage device ("DASD")), magnetic tape, electronic read-only memory (e.g., ROM, EPROM, or EEPROM), optical storage, (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the computer 104, and is configured to perform operations to implement the method of the invention. The logic circuitry may be implemented using many different types of circuitry, as discussed above.

Overall Sequence of Operation

Figure 4:
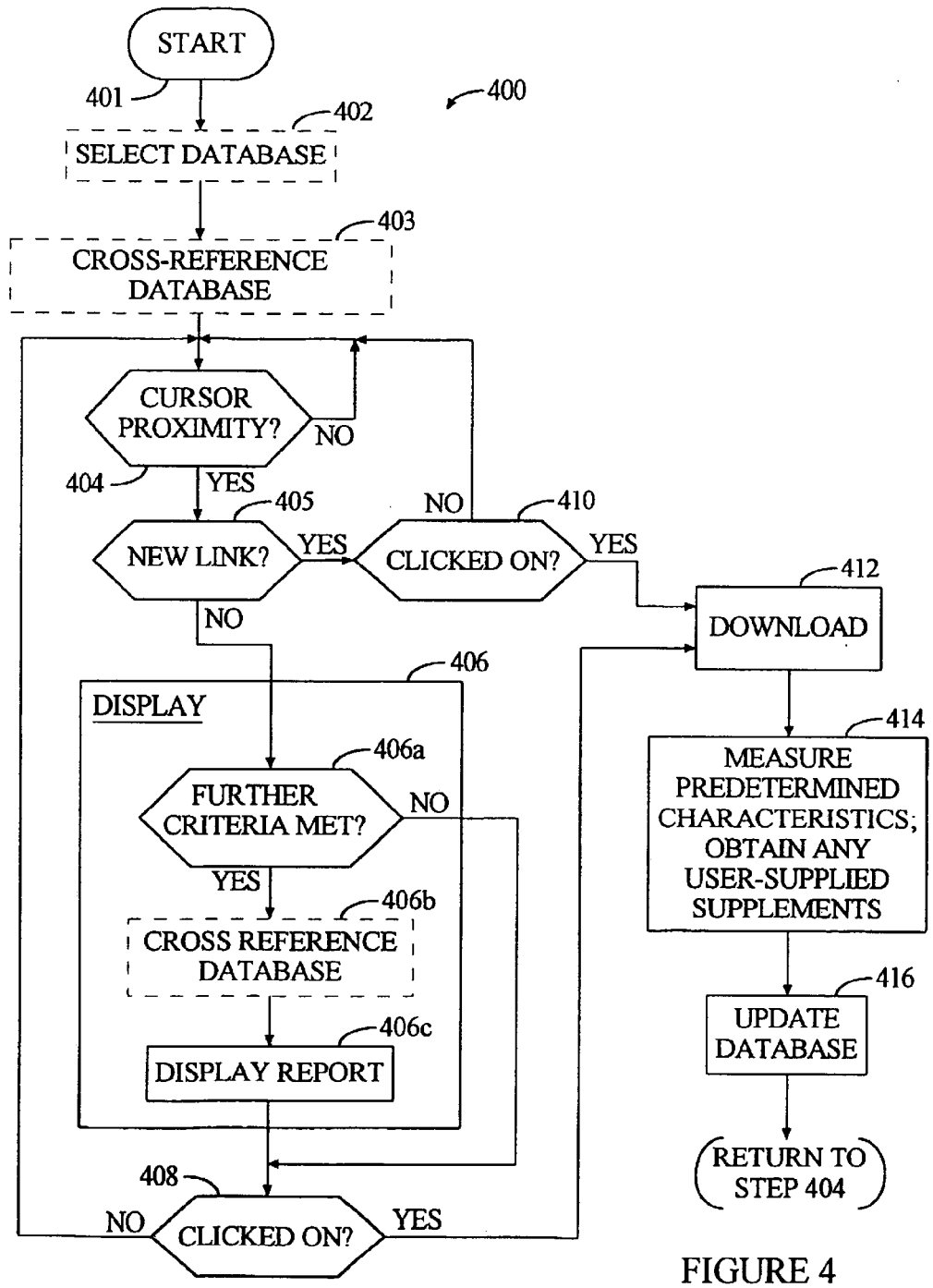
FIG. 4 is a flowchart of an operational sequence for operating a web browser to provide proximity sensitive hyperlink history reports, according to the invention.

FIG. 4 shows a sequence 400 to illustrate one example of the method aspect of the present invention. For ease of explanation, but without any intended limitation, the example of FIG. 4 is described in the context of the system 100 described above (FIG. 1A). The sequence 400 is performed by the computer 104. More particularly, the sequence 400 may be performed by the web browser 105 or other similar program running on the computer 104. In cooperation with other functions of the computer's web browser, the sequence 400 senses a predetermined input, such as cursor proximity to a hyperlink, and in response displays a report of various characteristics from past visits to the underlying, hyperlinked data.

The sequence 400 is initiated in step 401, which may occur when the user instructs the computer 104 to download a web page, for example by entering a web address into the web browser 105 or selecting a hyperlink. This is the "current" web page. Next, step 402 is performed in the optional hardware embodiment where the computer 104 has access to multiple databases, such as one personal database (present in local storage 112) and one shared database (present in common storage 158). In still another embodiment, the computer 104 itself may store multiple databases in local storage 112 for different users that operate the computer 104.

If multiple databases are available, the user in step 402 chooses one of the personal or shared databases to use. For purposes of illustration, the user selects the database 113 in this example. The user's selection may, for example, occur in response to prompting by the computer 104 at an appropriate time, such as loading of the web browser 105. Instead of user selection, the database may be chosen automatically by the computer 104 in accordance with the user's identity, determined by the user's entry of a password, log-on sequence, user name, or other technique.

Next, another optional step may be performed. Namely, the computer 104 in step 403 identifies each hyperlink in the current web page, and then proceeds to cross-reference the selected database 113 to identify characteristics of the data underlying each hyperlink, as obtained from one or more instances where the user previously selected the current hyperlink. In the illustrated example, step 403 utilizes the personal database 113. This step is an optional measure to enable the computer 104 to more quickly present its hyperlink report later, when the cursor passes the cursor over displayed hyperlinks.

After step 403, the computer determines whether the cursor 103 has a certain predetermined proximity to a hyperlink appearing on the display 102 (step 404). In the present example, this proximity entails the cursor residing over or near the hyperlink, such that pressing of a mouse button would "select" the hyperlink and trigger downloading of the underlying data.

When the conditions of step 404 are satisfied for a hyperlink, step 405 consults the database 113 to determine whether this "current" hyperlink is "new" or not. In addition to the personal database 113, step 404 may also consult one or more shared databases, such as 158, 160 if the user had selected them in step 402. The current hyperlink is not new if the computer operator previously directed the web browser 105 to select the current hyperlink to download underlying data represented by that hyperlink. If the hyperlink is not new, step 405 advances to step 406, which includes steps 406a–406c.

Step 406a determines whether further criteria (if any) are met for displaying information about past visits to the current hyperlink. Step 406a requires such further input (if any) to expedite other operations of the web browser 105 by preventing excessive analysis of web sites as the cursor passes over them. Some examples of such further input may include requiring the cursor to hover at or near the hyperlink for a certain time, requiring the user to press a keyboard key or mouse button while the cursor is at or near the hyperlink, etc. If these criteria are not met, step 406a advances to step 408, which is discussed below.

If the criteria of step 406a are met, step 406b cross-references the selected database to identify characteristics of the underlying data obtained from one or more instances where the web browser 105 selected the current hyperlink. According to one embodiment, step 406b may only cross-reference certain entries in the database for the current hyperlink if the user has specified certain hyperlink characteristics that the user is interested in and others where there is no interest, for example by user profile or other choice. For example, only download time and size may be of interest. In the single user, non-shared database embodiment, step 406c references the personal database 113 to identify characteristics of the current hyperlinks underlying data from the single user's previous visits to the current hyperlink. In the multi-user, shared database embodiment, step 406c references the appropriate shared database to identify collective characteristics of the current hyperlink's underlying data from all the previous visits to the current hyperlink by access group members. The database used in step 406b may be preselected if the optional step 402 is utilized. Furthermore, step 406b may be omitted entirely if the optional step 403 has been performed.

After step 406b, step 406c presents a report of information from the database 113 as it pertains to the current hyperlink. This report may employ the display 102, computer 104, devices 110, or any other means to convey information to a human computer user. For instance the report may use the display 102 to present text, graphics, animation, and/or video. In addition, the computer 104 may utilize its sound compatibilities to present music, voice, or other aural feedback. Furthermore, the device 110 may assist in presenting the report by providing tactile feedback such as heat, cold, vibration, or other sensation, which may further occur in varying magnitude, pulsewidth, frequency, and patterns to convey even more information.

Figure 5:
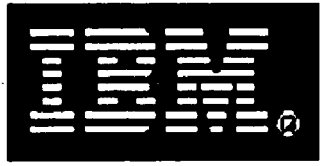
FIG. 5 is a diagram illustrating a sample visual report provided by the present invention.

In the case of visually conveyed data, the report information may be presented in a pop-up window or "bubble," Microsoft tooltip, toolbar, readout on a web browser's lower tray, or another suitable format. Another type of visual report graphically changes the user's display based on complex conditions. For example, if a user has selected a hyperlink more than three times in the past and the user rating is greater than eight, then step 406c draws the hyperlink in a red color and a larger font while simultaneously activating a speech synthesizer to say "yes"; otherwise, the hyperlink is drawn in black, with a normal font, and no speech is produced. To provide a specific example of report presented in step 406c, FIG. 5 shows a strictly visual report concerning a hyperlink to underlying data that comprises the web site http://www.ibm.com.

After step 406c, step 408 determines whether the computer operator has manipulated the input device 110 by "mouse clicking" or other activity to select the hyperlink. By "selecting" the hyperlink, the computer operator instructs the web browser 105 to download the underlying data represented by the hyperlink. If the computer user has not selected the hyperlink, step 408 returns to step 402. On the other hand, if the computer user selects the hyperlink, step 408 advances to step 412, which is discussed below.

In contrast to the foregoing description, if step 405 determines that the current hyperlink is "new," step 405 advances to step 410. Step 410 determines whether the computer user has manipulated the input device 110 by "mouse clicking" or other activity to select the hyperlink. By "selecting" the hyperlink, the computer user instructs the web browser 105 to download the underlying data represented by the hyperlink. If the computer user has not selected the hyperlink, step 410 returns to step 404.

Alternatively, if the user selects the current hyperlink, step 410 proceeds to step 412, where the web browser 105 downloads the underlying data of the current hyperlink. Step 414 then proceeds to measure the characteristics of the underlying data and the process of its downloading. An exemplary set of these characteristics are shown in TABLE 1 (above). The measurement of step 414 occurs during and/or after the download, as appropriate to the particular characteristic being measured. In addition to measuring characteristics of the download, step 414 may optionally obtain user-supplied supplementary information that is beneficial, but might not be particularly amenable to measurement. For example, the computer 104 in step 414 may prompt the computer operator to rate the underlying data (web site, software, image, etc.). As another example, step 414 may solicit the computer operator to choose a representative "thumbnail" image, icon, sound, or other item to represent the underlying data whenever the report (step 406c) is displayed for that hyperlink.

After step 414, step 416 updates the database 113 to incorporate the characteristics from step 414. After step 416, the routine 400 returns to step 404. If the cursor has moved off of the current hyperlink, step 404 evaluates the cursor's position relative to other displayed hyperlinks. However, if the cursor is still positioned over the current hyperlink, step 404 proceeds to step 405, which now considers the current hyperlink to be "old," and routes the sequence 400 to step 406 to display a report of the newly created database entry.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for operating a computer to present historical information about hyperlinks shown on web pages, the method comprising operations of:

responsive to each occasion on which a computer receives user selection of a hyperlink to download underlying data represented by the hyperlink, the computer downloading the underlying data represented by the hyperlink and recording predetermined characteristics of the underlying data in a database;

responsive to a computer receiving predetermined user input including direction of a cursor proximate a hyperlink,
the computer consulting the database to determine whether one or more users in a predefined access group have previously selected the hyperlink to download underlying data represented by the hyperlink;
only if one or more of the users have previously selected the hyperlink, presenting information representing characteristics of the underlying data obtained from previous selections of the hyperlink by users in the access group;

the computer obtaining user selection of types of characteristics of interest to the user; and the presenting operation is limited to characteristics of the underlying data of the selected types.

2. The method of claim 1, the presenting operation including at least one of the following: displaying text, displaying graphics, generating sound, providing tactile output.

3. The method of claim 1, the operations further comprising:

prior to consulting the database, selecting the database from multiple available databases.

4. The method of claim 1, the predetermined user input additionally including depressing of one or more buttons on a computer mouse while the cursor is proximate the hyperlink.

5. The method of claim 1, the access group having a sole user, and the presenting operation presenting information representing characteristics of the underlying data obtained from previous selections of the hyperlink by the sole user.

6. The method of claim 1, the access group having multiple users, and the presenting operation presenting information representing characteristics of the underlying data obtained from previous selections of the hyperlink by any of the multiple users.

7. The method of claim 1, where the characteristics of the underlying data obtained from previous selections include one or more of the following:

size of the underlying data;

dates of one or more previous selections of the hyperlink;

information representing a length of time required to download the underlying data;

times of one or more previous selections of the hyperlink;

number of previous selections of the hyperlink;

one or more representative multimedia symbols, including one or more of the following:
graphics, sound, animation, video;

user ratings of the underlying data;

whether the underlying data constitutes a web site that is under construction;

whether the hyperlink represents an expired link;

whether the user has bookmarked the underlying data; and any errors occurring during previous selections of the hyperlink.

8. A method for operating a computer to present historical information about hyperlinks shown on web pages, the method comprising operations of:

responsive to each occasion on which a computer receives user selection of a hyperlink to download underlying data represented by the hyperlink, the computer downloading the underlying data represented by the hyperlink and recording predetermined characteristics of the underlying data in a database;

responsive to a computer receiving predetermined user input including direction of a cursor proximate a hyperlink,
the computer consulting the database to determine whether one or more users in a predefined access group have previously selected the hyperlink to download underlying data represented by the hyperlink;
only if one or more of the users have previously selected the hyperlink, presenting information representing characteristics of the underlying data obtained from previous selections of the hyperlink by users in the access group;

further response to each occasion on which the computer receives user selection of a hyperlink to download underlying data represented by the hyperlink;
the computer soliciting user specification of one or more of the following for the underlying data;
user rating of the underlying data;
one or more representative multimedia symbols of one or more of the following types: graphics images, sounds, videos, animations, tactile sensations; and
the computer recording the user specification in the database in association with the hyperlink.

9. A method of operating a computer to present historical information about hyperlinks shown on web pages, the method comprising operations of:

responsive to each occasion on which a computer receives user selection of a hyperlink to download underlying data represented by the hyperlink, the computer downloading the underlying data represented by the hyperlink and recording predetermined characteristics of the underlying data in a database;

responsive to user instructions to download a web page,
the computer identifying any hyperlinks contained in the web page and determining whether one or more users in a predefined access group have previously selected the hyperlink to download underlying data represented by the hyperlink;
for each previously selected hyperlink, retrieving one or more characteristics of the underlying data obtained from previous selections of the hyperlink by users in the access group;

during times when the computer receives predetermined user input including direction of a cursor proximate a hyperlink, the computer presenting information representative of the retrieved characteristics for the proximate hyperlink;

the computer obtaining user selection of types of characteristics of interest to the user; and the presenting operation is limited to characteristics of the underlying data of the selected types.

10. A method for operating a computer to present hyperlink specific historical information for a predefined group of computer users, the method comprising the operations of:

responsive to any user in the group selecting a hyperlink to download underlying data represented by the hyperlink, recording predetermined characteristics of the underlying data in a shared database accessible to all users in the group;

responsive to any user in the group directing a computer to perform predetermined actions including directing a cursor proximate a hyperlink, that computer accessing the shared database to determine whether any user in the group has previously selected the hyperlink to download underlying data represented by the hyperlink, and only if one or more users in the group have previously selected the hyperlink, the computer referencing the shared database to obtain characteristics of the underlying data from the previous selections of the hyperlink and then presenting information representing the obtained characteristic to the user;

the computer obtaining user selection of types of characteristics of interest to the user; and the presenting operation is limited to characteristics of the underlying data of the selected types.

11. A signal-bearing medium tangibly embodying a program of machine-readable instructions executable by a digital processing apparatus to perform a method for operating a computer to present historical information about hyperlinks shown on web pages, the method comprising operations of:

responsive to each occasion on which a computer receives user selection of a hyperlink to download underlying data represented by the hyperlink, the computer downloading the underlying data represented by the hyperlink and recording predetermined characteristics of the underlying data in a database;

responsive to a computer receiving predetermined user input including direction of a cursor proximate a hyperlink, the computer consulting the database to determine whether one or more users in a predefined access group have previously selected the hyperlink to download underlying data represented by the hyperlink;

only if one or more of the users have previously selected the hyperlink, presenting information representing characteristics of the underlying data obtained from previous selections of the hyperlink by users in the access group;

the computer obtaining user selection of types of characteristics of interest to the user; and the presenting operation is limited to characteristics of the underlying data of the selected types.

12. The medium of claim 11, the presenting operation including at least one of the following: displaying text, displaying graphics, generating sound, providing tactile output.

13. The medium of claim 11, the operations further comprising:

prior to consulting the database, selecting the database from multiple available databases.

14. The medium of claim 11, the predetermined user input additionally including depressing of one or more buttons on a computer mouse while the cursor is proximate the hyperlink.

15. The medium of claim 11, the access group having a sole user, and the presenting operation presenting information representing characteristics of the underlying data obtained from previous selections of the hyperlink by the sole user.

16. The medium of claim 11, the access group having multiple users, and the presenting operation presenting information representing characteristics of the underlying data obtained from previous selections of the hyperlink by any of the multiple users.

17. The medium of claim 11, where the characteristics of the underlying data obtained from previous selections include one or more of the following:

size of the underlying data;

dates of one or more previous selections of the hyperlink;

information representing a length of time required to download the underlying data;

times of or more previous selections of the hyperlink;

number of previous selections of the hyperlink;

one or more representative multimedia symbols, including one or more of the following:

graphics, sound, animation, video;

user ratings of the underlying data;

whether the underlying data constitutes a web site that is under construction;

whether the hyperlink represents an expired link;

whether the user has bookmarked the underlying data;

any errors occurring during previous selections of the hyperlink.

18. A signal-bearing medium tangibly embodying a program of machine-readable instructions executable by a digital processing apparatus to perform a method for operating a computer to present historical information about hyperlinks shown on web pages, the method comprising operations of:

responsive to each occasion on which a computer receives user selection of a hyperlink to download underlying data represented by the hyperlink, the computer downloading the underlying data represented by the hyperlink and recording predetermined characteristics of the underlying data in a database;

responsive to a computer receiving predetermined user input including direction of a cursor proximate a hyperlink, the computer consulting the database to determine whether one or more users in a predefined access group have previously selected the hyperlink to download underlying data represented by the hyperlink;

only if one or more of the users have previously selected the hyperlink, presenting information representing characteristics of the underlying data obtained from previous selections of the hyperlink by users in the access group;

further responsive to each occasion on which the computer receives user selection of a hyperlink to download underlying data represented by the hyperlink:

the computer soliciting user input specifying one or more of the following for the underlying data:

user rating of the underlying data;
one or more representative multimedia symbols of one or more of the following types: graphics images, sounds, videos, animations, tactile sensations; and
the computer recording the user specification in the database in association with the hyperlink.

19. A signal-bearing medium tangibly embodying a program of machine-readable instructions executable by a digital processing apparatus to perform a method for operating a computer to present historical information about hyperlinks shown on web pages, the method comprising operations of:

responsive to each occasion on which a computer receives user selection of a hyperlink to download underlying data represented by the hyperlink, the computer downloading the underlying data represented by the hyperlink and recording predetermined characteristics of the underlying data in a database;

responsive to user instructions to download a web page, the computer identifying any hyperlinks contained in the web page and determining whether one or more users in a predefined access group have previously selected the hyperlink to download underlying data represented by the hyperlink;

for each previously selected hyperlink, retrieving one or more characteristics of the underlying data obtained from previous selections of the hyperlink by users in the access group;

during times when the computer receives predetermined user input including direction of a cursor proximate a hyperlink, the computer presenting information representative of the retrieved characteristics for the proximate hyperlink;

the computer obtaining user selection of types of characteristics of interest to the user; and the presenting operation is limited to characteristics of the underlying data of the selected types.

20. An information system, comprising:
one or more input devices;
a storage;
computer, the computer being coupled to the input devices and the storage, and
configured to perform operations to present historical information about hyperlinks shown on web pages, the operations comprising:
responsive to each occasion on which a computer receives user selection of a hyperlink to download underlying data represented by the hyperlink, the computer downloading the underlying data represented by the hyperlink and recording predetermined characteristics of the underlying data in a database;

responsive to a computer receiving predetermined user input including direction of a cursor proximate a hyperlink,
the computer consulting the database to determine whether one or more users in a predefined access group have previously selected the hyperlink to download underlying data represented by the hyperlink;

only if one ore more of the users have previously selected the hyperlink, presenting information representing characteristics of the underlying data obtained from previous selections of the hyperlink by users in the access group;

the computer obtaining user selection of types of characteristics of interest to the user; and the presenting operation is limited to characteristics of the underlying data of the selected types.

21. An information system, comprising:
one or more input devices;
a storage including a database;
a computer, coupled to the input devices and the storage, and configured to perform operations to present historical information about hyperlinks shown on web pages, the operations comprising:
responsive to each occasion on which the computer receives user selection of a hyperlink to download underlying data represented by the hyperlink, the computer downloading the underlying data represented by the hyperlink and recording predetermined characteristics of the underlying data in a database;

responsive to user instructions to download a web page, the computer identifying any hyperlinks contained in the web page and determining whether one or more users in a predefined access group have previously selected the hyperlink to download underlying data represented by the hyperlink;

for each previously selected hyperlink, retrieving one or more characteristics of the underlying data obtained from previous selections of the hyperlink by users in the access group;

during times when the computer receives predetermined user input including direction of a cursor proximate a hyperlink, the computer presenting information representative of the retrieved characteristics for the proximate hyperlink;

the computer obtaining user selection of types of characteristics of interest to the user; and the presenting operation is limited to characteristics of the underlying data of the selected types.

22. An information system, comprising:
a shared database;
multiple computers each having access to the shared database;
where the computers are configured to present hyperlink specific historical download information for a predefined group of computer users by performing operations comprising:
responsive to any user in the group selecting a hyperlink to download underlying data represented by the hyperlink, recording predetermined characteristics of the underlying data in a shared database accessible to all users in the group;

responsive to any user in the group directing a computer to perform predetermined actions including directing a cursor proximate a hyperlink, that computer accessing the shared database to determine whether any user in the group has previously selected the hyperlink to download underlying data represented by the hyperlink, and only if one or more users in the group have previously selected the hyperlink, the computer referencing the shared database to obtain characteristics of the underlying data from the previous selections of the hyperlink and then presenting information representing the obtained characteristic to the user; and the computer obtaining user selection of types of characteristics of interest to the user; and the presenting operation is limited to characteristics of the underlying data of the selected types.

* * * * *